United States Patent
Chen

(10) Patent No.: US 9,680,976 B2
(45) Date of Patent: Jun. 13, 2017

(54) ELECTRONIC DEVICE

(75) Inventor: Cheng-Yi Chen, Taoyuan County (TW)

(73) Assignee: HTC CORPORATION, Taoyuan (TW)

( * ) Notice: Subject to any disclaimer, the term of this patent is extended or adjusted under 35 U.S.C. 154(b) by 274 days.

(21) Appl. No.: 13/590,182

(22) Filed: Aug. 20, 2012

(65) Prior Publication Data

US 2014/0050346 A1  Feb. 20, 2014

(51) Int. Cl.
*H04M 1/05* (2006.01)
*G06F 1/16* (2006.01)
*H04M 1/02* (2006.01)

(52) U.S. Cl.
CPC ............ *H04M 1/05* (2013.01); *G06F 1/1639* (2013.01); *H04M 1/0272* (2013.01); *H04M 1/0285* (2013.01); *H04M 1/0235* (2013.01); *H04M 1/0264* (2013.01); *H04M 2250/12* (2013.01)

(58) Field of Classification Search
CPC ...... G06F 3/03545; G06F 3/0386; G06F 1/16; G06F 3/01; G06F 3/033; G06F 3/0346; G06F 3/0354; G06F 3/042; G06F 3/0421; G06F 3/03542; G06F 3/0425; G06F 3/0426; G06F 1/1639; H04R 1/02; H04M 1/05; H04M 1/0272; H04M 1/0285; H04M 1/0235; H04M 1/0264; H04M 2250/12
USPC ................... 345/169, 179, 180, 156; 381/334
See application file for complete search history.

(56) References Cited

U.S. PATENT DOCUMENTS

| | | | |
|---|---|---|---|
| 6,832,724 B2 * | 12/2004 | Yavid et al. ................... 235/454 |
| 7,164,811 B2 * | 1/2007 | Nathanson ............ G03B 17/17 |
| | | | 348/207.99 |
| 8,254,605 B2 * | 8/2012 | Van Schaack et al. ........ 381/309 |
| 8,781,135 B2 * | 7/2014 | Lu ..................................... 381/79 |
| 2005/0156915 A1 * | 7/2005 | Fisher .................... G06F 3/0317 |
| | | | 345/179 |
| 2008/0042969 A1 * | 2/2008 | Baker ........................... 345/156 |
| 2009/0295730 A1 * | 12/2009 | Shin ...................... G06F 3/0221 |
| | | | 345/168 |

(Continued)

FOREIGN PATENT DOCUMENTS

| | | |
|---|---|---|
| CN | 1412712 | 4/2003 |
| TW | 201120685 | 6/2011 |
| TW | 201135558 | 10/2011 |

OTHER PUBLICATIONS

"Office Action of Taiwan Counterpart Application", issued on May 27, 2014, p. 1-p. 7.

(Continued)

*Primary Examiner* — Xu Mei
*Assistant Examiner* — Jason R Kurr
(74) *Attorney, Agent, or Firm* — Jianq Chyun IP Office

(57) ABSTRACT

An electronic device including a casing, a control module, a micro-projecting unit and a motion sensing unit is provided. The control module is disposed in the casing. The micro-projecting unit is disposed on the casing and electrically connected to the control module. The micro-projecting unit is capable of projecting a projection beam to form a frame in a projection region. The motion sensing unit is disposed on the casing and electrically connected to the control module. The motion sensing unit is capable of sensing a motion in the projection region. The control module is capable of applying the motion sensed by the motion sensing unit to change the frame.

22 Claims, 7 Drawing Sheets

(56) References Cited

U.S. PATENT DOCUMENTS

2010/0103178 A1* 4/2010 Song et al. ................ 345/473
2011/0175940 A1* 7/2011 Terauchi et al. ............ 345/690

OTHER PUBLICATIONS

"Office Action of Chinese Counterpart Application", issued on Oct. 12, 2015, p. 1-p. 5.

* cited by examiner

ELECTRONIC DEVICE

BACKGROUND

Field of the Invention

The present application generally relates to an electronic device. More particularly, the present application relates to an electronic device that allows a frame watched by a user not to be limited by a screen size.

Description of Related Art

Along with the development of technology, electronic devices have almost become one of the necessities of life to modern people. For example, a mobile phone is an electronic devices provided with telephone functions and portable for users.

Currently, most of the mobile phones are equipped with networking and camera functions, which allows the users to view web page information or taken images via the screen of the mobile phone. However, the size of the displayed web pages and images is limited by the screen size of the mobile phone. For the users to view conveniently, the mobile phones in recent years are developed toward having large screen size and high resolution.

However, the mobile phones become power-consuming due to the features of large screen size and high resolution. Meanwhile, the size of the mobile phone is increased with the screen size, which leads to reduction in convenience of portability.

SUMMARY

The invention relates to an electronic device displaying frames without being limited by the screen size, which allows a user to adjust sizes of the frames as desired. Meanwhile, the electronic device has advantages such as being small-sized, easy to carry and power-saving.

The invention relates to an electronic device including a casing, a control module, a micro-projecting unit and a motion sensing unit. The control module is disposed in the casing. The micro-projecting unit is disposed on the casing and electrically connected to the control module and is capable of projecting a projection beam to form a frame on a projection region. The motion sensing unit is disposed on the casing and electrically connected to the control module and is capable of sensing a motion in the projection region. The control module is capable of applying the motion sensed by the motion sensing unit to change the frame.

In an embodiment of the invention, a wireless communication module, a speaker unit and an audio-receiving unit is further included. The wireless communication module is disposed in the casing and electrically connected to the control module. The speaker unit is disposed in the casing and electrically connected to the control module. The audio-receiving unit is disposed in the casing and electrically connected to control module.

In an embodiment of the invention, the casing includes a sound-output aperture and a sound-input aperture. The sound-output aperture and the sound-input aperture are correspondingly connected through the speaker unit and the audio-receiving unit, respectively.

In an embodiment of the invention, the casing has a terminal portion. The micro-projecting unit and the motion sensing unit protrude from the terminal portion, respectively so that the projection region of the micro-projecting unit is a wide viewing angle.

In an embodiment of the invention, a camera unit is further included. The camera unit is disposed on the casing and electrically connected with the control module. The camera unit is capable of capturing an image within a camera region.

In an embodiment of the invention, the camera unit protrudes from the terminal portion of the casing so that the camera region of the camera unit is a wide viewing angle.

In an embodiment of the invention, a range of the camera region is substantially equal to a range of the projection region.

In an embodiment of the invention, a wearing element is further included. The wearing element is disposed on the casing and adapted to fix the casing on the user's body.

In an embodiment of the invention, the wearing element is an earhook element. The earhook element is disposed adjacent to the sound-output aperture of the casing.

In an embodiment of the invention, the casing is pen-shaped, and the earhook element is adapted to be a pen clip.

In an embodiment of the invention, a key set is further included. The key set is disposed on the casing and electrically connected to the control module.

In an embodiment of the invention, the key set includes a power key or a set of volume control keys.

In an embodiment of the invention, the casing includes a first casing element and a second casing element. The speaker unit is disposed on the first casing element. The audio-receiving unit is disposed on the second casing element. the second casing element is slidably covered by the first casing element so that the audio-receiving unit approaches or departs from the speaker unit.

To sum up, in the electronic device of the invention, the micro-projecting unit projects to display desired information on a projection surface (e.g. a wall surface or a table surface). Thus, the frame is not limited by the screen size. Further, in the electronic device of the invention, the motion sensing unit senses a motion of the user so that the control module applies the motion sensed by the motion sensing unit to change the projected frame. Accordingly, the user can easily adjust the frame size or operate the frame that is displayed. Additionally, the electronic device of the invention may be designed as pen-shaped and fixed on the user's body by the wearing element, which is small-sized and convenient to carry.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF EMBODIMENTS

Figure 1A:
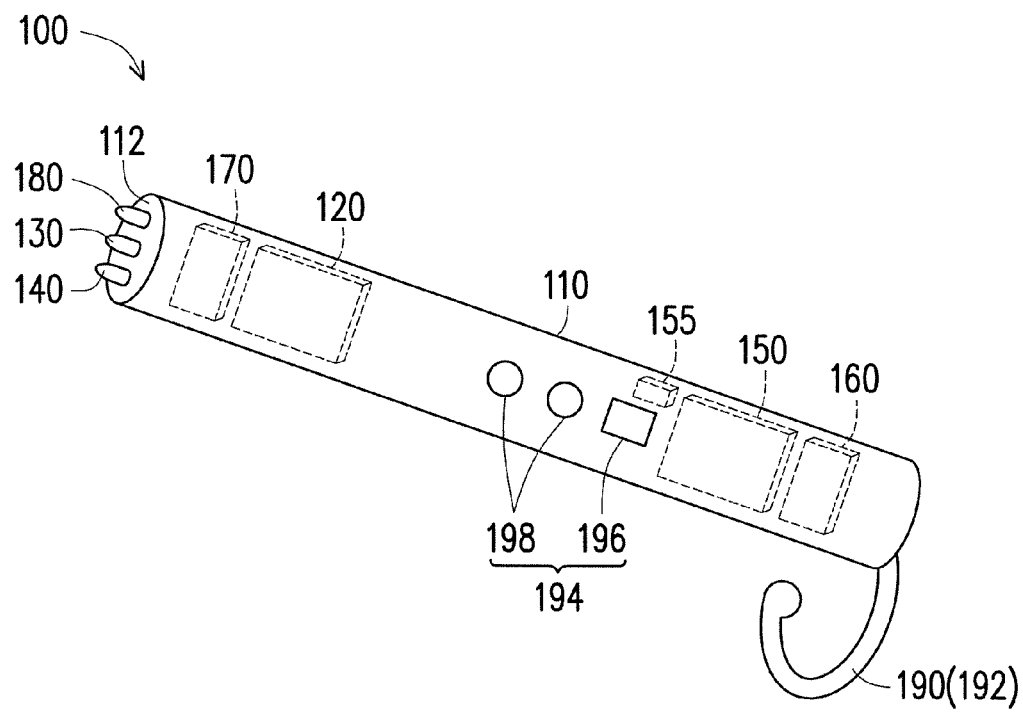
FIG. 1A is a schematic front view of an electronic device according to an embodiment of the invention.

FIG. 1A is a schematic front view of an electronic device according to an embodiment of the invention. Referring to FIG. 1A, an electronic device 100 of the present embodiment includes a casing 110, a control module 120, a micro-projecting unit 130 and a motion sensing unit 140. The control module 120 is disposed in the casing 110. The micro-projecting unit 130 is disposed on the casing 110 and electrically connected to the control module 120. The motion sensing unit 140 is disposed on the casing 110 and electrically connected to the control module 120.

In the present embodiment, the electronic device 100 further includes a wireless communication module 150, a wireless transmission module 155, a speaker unit 160, an audio-receiving unit 170 and a camera unit 180. The wireless communication module 150 and the wireless transmission module 155 are disposed in the casing 110 and electrically connected to the control module 120. The speaker unit 160 and the audio-receiving unit 170 are respectively disposed adjacent to two opposite ends in the casing 110 for reducing interference with each other. Besides, the speaker unit 160 and the audio-receiving unit 170 are electrically connected to the control module 120, respectively. In the present embodiment, the electronic device 100 is a mobile phone. However, the type of the electronic device 100 is not limited thereto. The camera unit 180 is disposed on the casing 110 and electrically connected to the control module 120.

Moreover, the electronic device 100 of the present embodiment further includes a key set 194 which is disposed on the casing 110 and electrically connected to the control module 120. The key set 194 includes a power key 196 or a set of volume control keys 198. The power key 196 is configured to turn on or turn off the electronic device 100. The volume control keys 198 are configured to adjust volume of the sound output by the speaker unit 160. Certainly, types and functions of the key set 194 are not limited to the above.

Figure 1B:
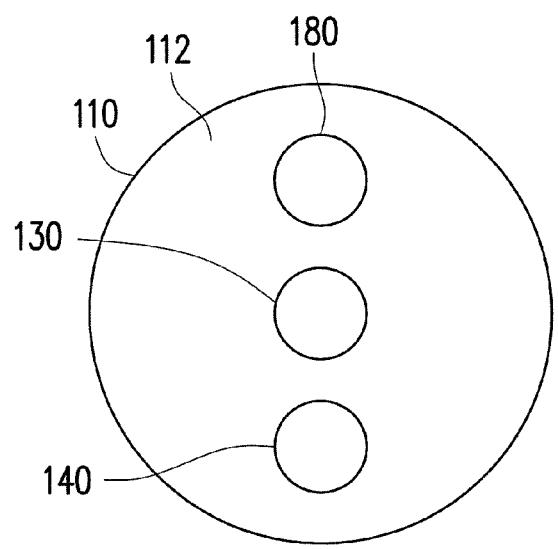
FIG. 1B is a schematic view illustrating a terminal portion of the electronic device depicted in FIG. 1A.

FIG. 1B is a schematic view illustrating a terminal portion of the electronic device depicted in FIG. 1A. Referring to FIG. 1B, the casing 110 has a terminal portion 112. The micro-projecting unit 130, the motion sensing unit 140 and the camera unit 180 respectively protrude from the terminal portion 112. Thus, the micro-projecting unit 130 is capable of projecting a range in a wide viewing angle, the motion sensing unit 140 is capable of sensing a motion within a wider range, and the camera unit 180 is capable of capturing an image in a wide viewing angle.

Figure 1C:
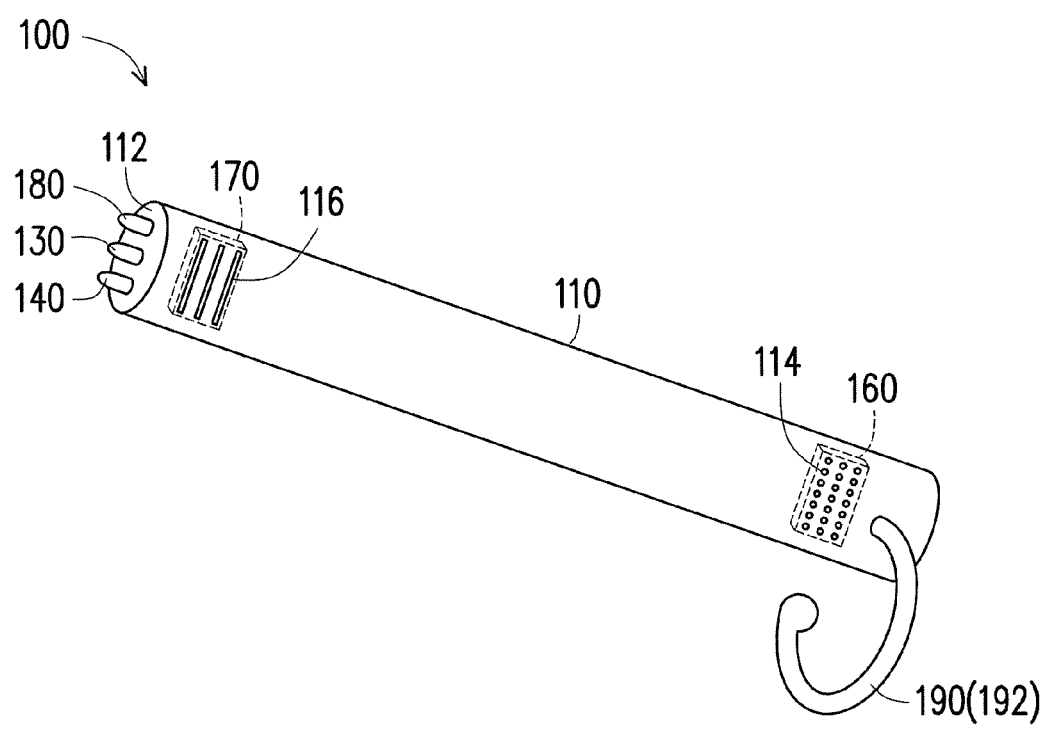
FIG. 1C is a schematic rear view of the electronic device depicted in FIG. 1A.

FIG. 1C is a schematic rear view of the electronic device depicted in FIG. 1A. Referring to FIG. 1C, the casing 110 includes a sound-output aperture 114 and a sound-input aperture 116 correspondingly connected through the speaker unit 160 and the audio-receiving unit 170, respectively. In the present embodiment, the sound-output aperture 114 and the sound-input aperture 116 are located adjacent to the two ends of the casing 110 for corresponding to the speaker unit 160 and the audio-receiving unit 170.

Figure 1D:
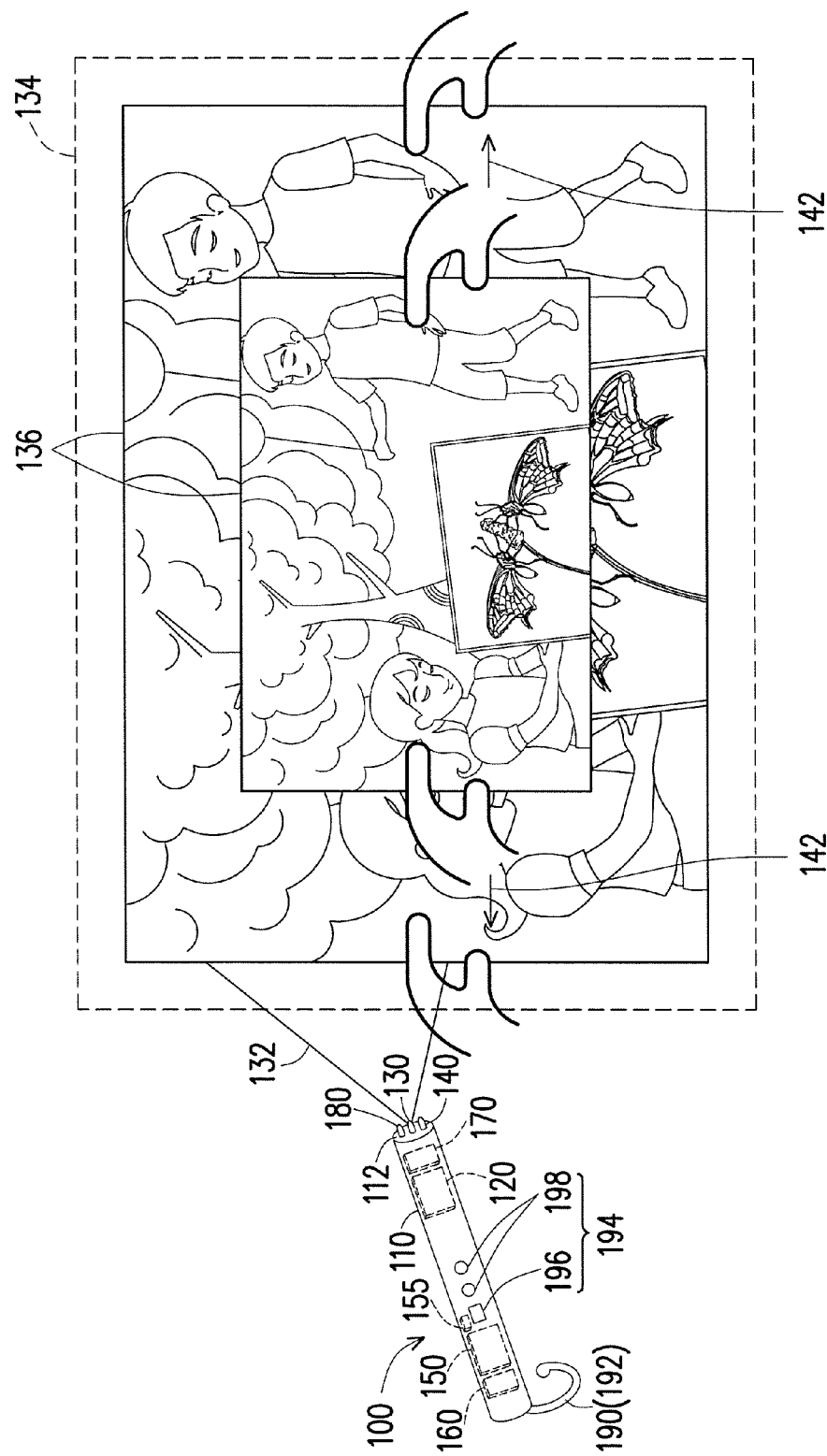
FIG. 1D is a schematic view illustrating a frame projected by the electronic device depicted in FIG. 1A and changed according to a motion of a user.

FIG. 1D is a schematic view illustrating a frame projected by the electronic device depicted in FIG. 1A and changed according to a motion of a user. Referring to FIG. 1D, the electronic device 100 is capable of projecting a projection beam 132 of information to be displayed through the micro-projecting unit 130 to form a frame 136 on a projection region 134. For example, the user may project a file or web information stored in the electronic device 100 on a projection surface (e.g. a table surface or a wall surface) for viewing. The micro-projecting unit 130 may automatically focus by determining a distance from the projection region 134 so as to clearly display the frame 136.

Additionally, the electronic device 100 is capable of sensing a motion 142 within the projection region 134 through the motion sensing unit 140 and transmitting the sensed motion information to the control module 120. A plurality of instructions corresponding to motion information is recorded in the control module 120 so that the control module 120 is capable of applying the motion sensed by the motion sensing unit 140 to change the frame 136 projected by the micro-projecting unit 130.

For example, the user may directly move both hands outward to enlarge the frame 136, as shown in FIG. 1D. Otherwise, the user may also move both hands inward to shrink the frame 136. Additionally, the size of the frame 136 may be smaller than or equal to the projection region 134 able to be projected by the micro-projecting unit 130, and thus, if the frame 136 is not full of the entire projection region 134, the user may also drag the frame 136 to another position in the projection region 134. Besides, when the frame 136 shows an interface of an application program, the user may click on the frame 136 so that the control module 120 is capable of operating the motion 142 received by the motion sensing unit 140 on the frame 136 to execute the application program. Certainly, the instructions recorded in the control module 120 are not limited to the above.

Figure 1E:
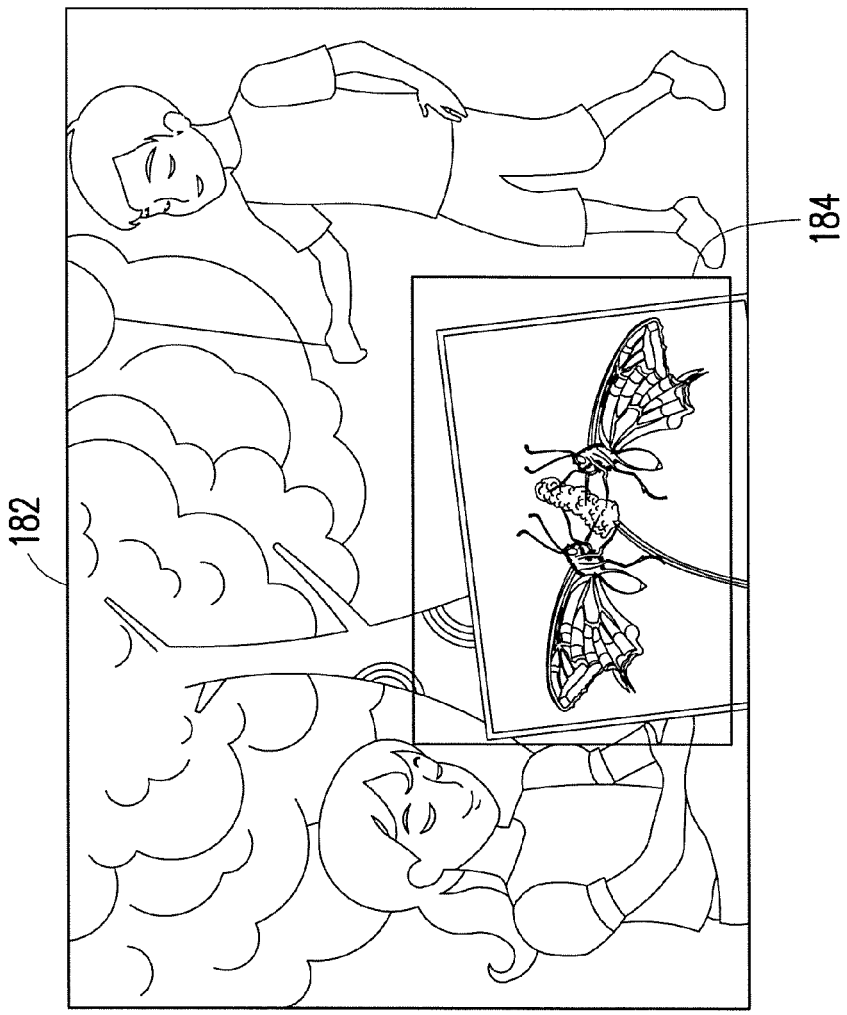
FIG. 1E is a schematic view illustrating a camera unit of the electronic device depicted in FIG. 1A capturing an image.
Figure 1E:
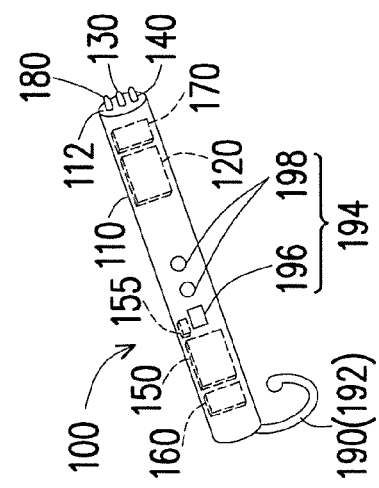

FIG. 1E is a schematic view illustrating a camera unit of the electronic device depicted in FIG. 1A capturing an image. Referring to FIG. 1E, when the user desires to photograph by using the electronic device 100, the user capture an image 184 within a camera region 182 by the camera unit 180. In the present embodiment, the camera unit 180 is capable of automatically focusing to clearly capture the image 184. Under a situation where the image 184 to be captured by the user only occupies a part of camera region 182, the user may use gestures, for example, so that the control module 120 adjusts a range of the image 184 to be captured by the camera unit 180.

Moreover, as shown in FIG. 1B, since the micro-projecting unit 130, the motion sensing unit 140 and the camera unit 180 are disposed on a terminal portion 112 having a quite small area, they are quite close to one another. Thus, a size of the projection region 134 of the micro-projecting unit 130 is approximate to a range able to be sensed by the motion sensing unit 140 and the camera region 182 of the camera unit 180. Namely, in the present embodiment, a range of the camera region 182 is substantially equal to the range of the projection region 134.

Figure 1F:
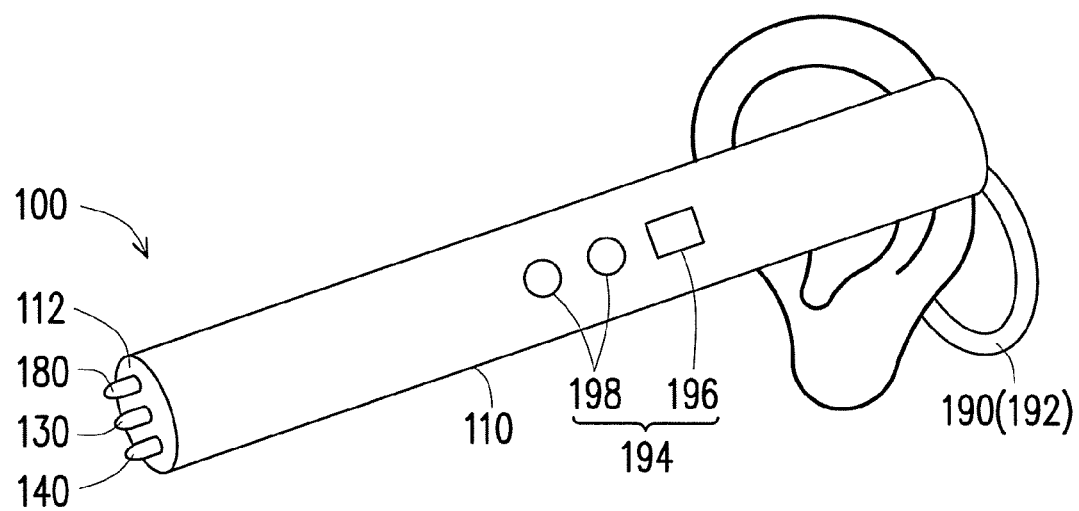
FIG. 1F is a schematic view illustrating the electronic device depicted in FIG. 1A fixed on an ear of the user.

FIG. 1F is a schematic view illustrating the electronic device depicted in FIG. 1A fixed on an ear of the user. Referring to FIG. 1F, the electronic device 100 further includes a wearing element 190. The wearing element 190 is disposed on the casing 110 and configured to fix the casing 110 on the user's body. In the present embodiment, the wearing element 190 is an earhook element 192, wherein the earhook element 192 is disposed adjacent to the sound-output aperture 114 of the casing 110. The electronic device 100 may be fixed on an ear of the user through the earhook element 192.

When the user desires to receive the sound output by the speaker unit 160 of the electronic device 100, the user may directly wear the electronic device 100 on his/her ear. At this time, the sound output by the speaker unit 160 is transmitted to the user's ear through the sound-output aperture 114. Likewise, the sound made by the user is transmitted into the audio-receiving unit 170 through the sound-input aperture 116. Since the electronic device 100 is fixed on the user's body through the wearing element 190, the user does not need to hold the electronic device 100 by his/her hand, which is quite convenient for usage.

When the user desires to view the file or the web information stored in the electronic device 100, the user may project the frame 136 as desired by using the micro-projecting unit 130. Since the electronic device 100 is worn on the user's ear, the terminal portion 112 of the casing 110 trends toward to the front of the user. Thus, the electronic device 100 projects the frame 136 directly in front of the user's face. At this time, an angle of the projection beam 132 projected by the micro-projecting unit 130 is approximate to a human viewing angle. Meanwhile, the frame 136 projected by the electronic device 100 may change its position as the user turns or moves his/her head for being displayed in front of the user continuously.

Since the electronic device 100 is worn on the user's ear, the hands of the user become available. When the user desires to change the frame 136, he/she may gesture variably by single hand or both hands for the motion sensing unit 140 to sense. Since the electronic device 100 worn on the ear is close to one of the eyes, the motions may be sensed by the motion sensing unit 140 as long as the user may see what he/she gestures. That is to say, the motion sensing unit 140 may receive a complete motion of the user. As such, according to each motion of the user, the frame 136 projected by the micro-projecting unit 130 may be quite sensitive for being changed. Likewise, when the electronic device 100 is worn on the ear, a position of the camera unit 180 is also quite close to the eye, the camera unit 180 may capture any image viewed by the user.

Figure 1G:
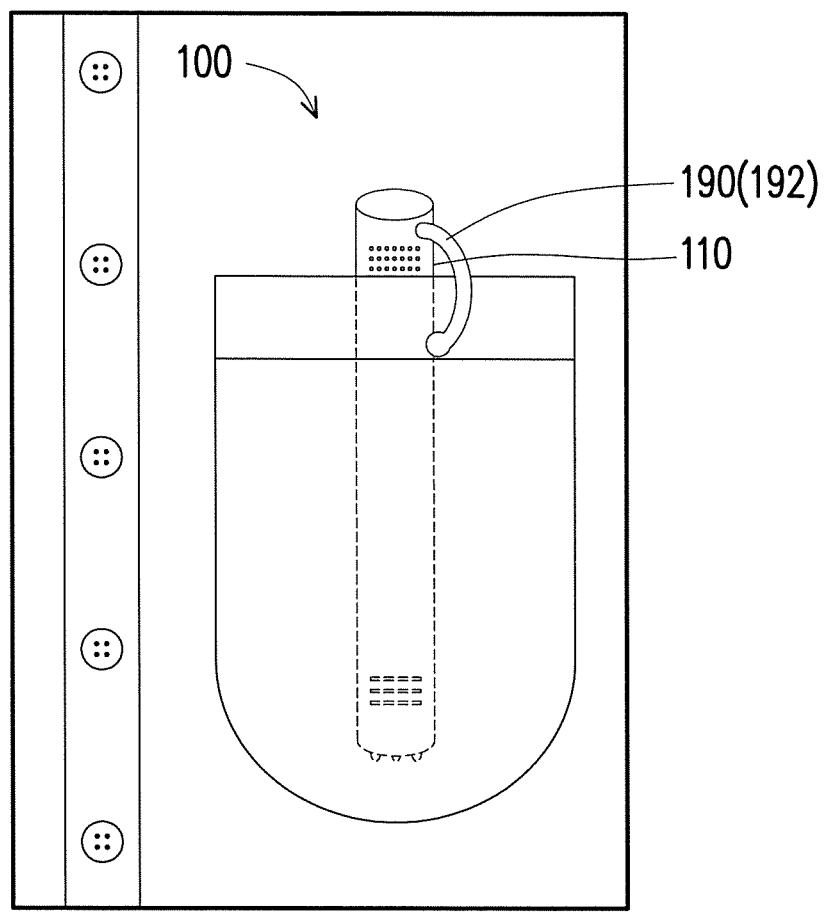
FIG. 1G is a schematic view illustrating the electronic device depicted in FIG. 1A fixed on the user's body.

FIG. 1G is a schematic view illustrating the electronic device depicted in FIG. 1A fixed on the user's body. Referring to FIG. 1G, since the casing 110 is pen-shaped, the user may also put the casing 110 is his/her pocket and fix the electronic device 100 on his/her body by using the earhook element 192 as a pen clip when the electronic device 100 is not in use. In other embodiments, the wearing element 190 may be spectacles, a headband or a hairpin for being worn on the user's head so that the micro-projecting unit 130, the motion sensing unit 140 and the camera unit 180 may surely capture the motion of the user or the image viewed by the user. Certainly, types and worn positions of the wearing element 190 are not limited to the above.

The electronic device 100 of the present embodiment does have to be equipped with a screen, and the information for being displayed may be projected to display on a projection surface (e.g. a wall surface or a table surface) by the micro-projecting unit 130. Thus, comparing with an electronic device having a more large-sized screen, the electronic device 100 of the present embodiment is more power-saving, and the size of the frame 136 may be adjusted as the user desires without being limited by the screen size. Further, the electronic device 100 may be designed as pen-shaped and fixed on the user's body through the wearing element 190, which is small-sized and convenient to carry, and the projection position may be changed as the user's head turns.

Figure 2A:
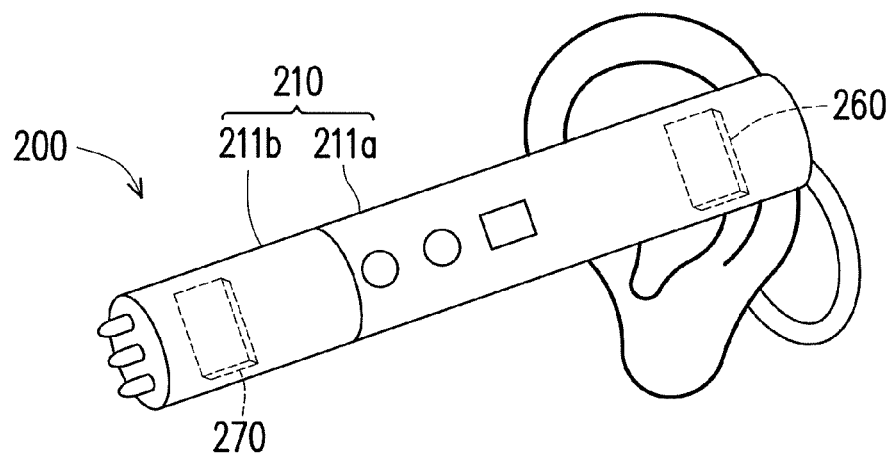
FIG. 2A is a schematic view illustrating an electronic device according to another embodiment of the invention.
Figure 2B:
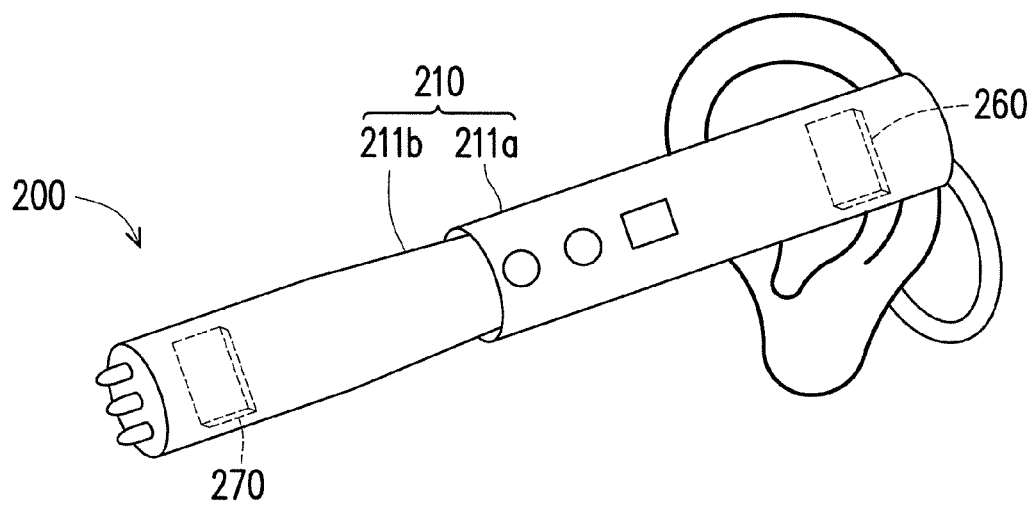
FIG. 2B is a schematic view illustrating a second casing element of the electronic device departing from the first casing element depicted in FIG. 2A.

FIG. 2A is a schematic view illustrating an electronic device according to another embodiment of the invention. FIG. 2B is a schematic view illustrating a second casing element of the electronic device departing from the first casing element depicted in FIG. 2A. Referring to FIG. 2A and FIG. 2B, an electronic device 200 depicted on FIG. 2A is different from the electronic device 100 depicted on FIG. 1A in that the electronic device depicted in FIG. 2A has a casing 210 including a first casing element 211a and a second casing element 211b. A speaker unit 260 is disposed in the first casing element 211a, an audio-receiving unit 270 is disposed in the second casing element 211b, and the second casing element 211b is slidably covered by the first casing element 211a to enable the audio-receiving unit 270 approach or depart from the speaker unit 260.

In the present embodiment, the situation that when the electronic device 200 is worn on the ear, the casing 210 is too short, which leads to the audio-receiving unit 270 far away from the user's mouth and the sound output by the user being unable to be clearly received is to be avoided. Thus, in the present embodiment, the speaker unit 260 and the audio-receiving unit 270 are respectively disposed in the first casing element 211a and second casing element 211b, and the relative distance between the first casing element 211a and second casing element 211b is relatively changeable. When the user wears the electronic device 200 on the ear and speaks to the audio-receiving unit 270, he/she may moves the second casing element 211b toward a direction departing from the first casing element 211a (as shown in FIG. 2B), so that the audio-receiving unit 270 is more close to the mouth to clearly receive the sound made by the user. When the audio-receiving unit 270 is not is use, the second casing element 211b is moved toward the first casing element 211a to return to the original status (as shown in FIG. 2A) to reduce the dimension of the electronic device 200.

In view of the foregoing, the electronic device of the invention project the desired information through the micro-projecting unit on a projection surface (e.g. a wall surface, a table surface or even a palm) for displaying. Accordingly, the electronic device of the invention does not have to be equipped with a screen, and production cost of the electronic device can be reduced. Meanwhile, the electronic device displays the frame by a projection method, and the size of the projection region can be adjusted by changing the distance between the electronic device and the projection surface. In addition, in the electronic device of the invention, the user's motion may be sensed by the motion sensing unit, and the control module may apply the motion sensed by the motion sensing unit to change the projected frame. Therefore, the user may adjust the frame size or operate the displayed frame as desired. Further, the electronic device of the invention may be designed as pen-shaped and fixed on the user's body through the wearing element, which is small-sized and convenient to carry.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An electronic device, comprising:

a casing;

a wearing element, disposed on the casing and adapted to fix the casing on an object during an operation of the electronic device;

a control module, disposed in the casing;

a micro-projector, disposed on the casing, electrically connected to the control module and configured to project a projection beam of visible light to form a frame on a projection region when the casing is fixed on the object during the operation of the electronic device; and a motion sensor, disposed on the casing, electrically connected to the control module and configured to sense a gesture other than a motion generated by the electronic device within the projection region when the casing is fixed on the object during the operation of the electronic device, wherein the control module is configured to apply the gesture sensed by the motion sensor to change a size or a position of the frame relative to the projection region, the casing has a planar terminal portion facing towards the projection region, the micro-projector and the motion sensor are disposed parallel to each other on the planar terminal portion and close to one another so that an area of the projection region of the micro-projector is within a range of an area sensed by the motion sensor.

2. The electronic device according to claim 1, further comprising:

a wireless communication module, disposed in the casing and electrically connected to the control module;

a speaker unit, disposed in the casing and electrically connected to the control module; and an audio-receiving unit, disposed in the casing and electrically connected to the control module.

3. The electronic device according to claim 2, wherein the casing comprises a sound-output aperture and a sound-input aperture, and the sound-output aperture and the sound-input aperture are correspondingly connected through the speaker unit and the audio-receiving unit, respectively.

4. The electronic device according to claim 2, wherein the casing comprising a first casing element and a second casing element, wherein the speaker unit is disposed in the first casing element, the audio-receiving unit is disposed in the second casing element, and the second casing element is slidably covered by the first casing element to enable the audio-receiving unit to approach or depart from the speaker unit.

5. The electronic device according to claim 1, further comprising:

a camera unit, disposed on the casing, electrically connected to the control module and configured to capture an image within a camera region.

6. The electronic device according to claim 5, wherein the camera unit protrudes from the planar terminal portion of the casing to enable the camera region of the camera unit to be a wide viewing angle.

7. The electronic device according to claim 5, wherein a range of the camera region is substantially equal to a range of the projection region.

8. The electronic device according to claim 1, wherein the wearing element is an earhook element disposed adjacent to the sound-output aperture of the casing.

9. The electronic device according to claim 8, wherein the casing is pen-shaped, and the earhook element is adapted to be a pen clip.

10. The electronic device according to claim 1, further comprising:

a key set, disposed on the casing and electrically connected to the control module.

11. The electronic device according to claim 10, wherein the key set comprises a power key or a set of volume control keys.

12. An electronic device, comprising:

a casing;

a wearing element, disposed on the casing and adapted to fix the casing on an object during an operation of the electronic device;

a control module, disposed in the casing;

a micro-projector, disposed on the casing, electrically connected to the control module and configured to project a projection beam of visible light to form a frame on a projection region when the casing is fixed on the object during the operation of the electronic device; and a motion sensor, disposed on the casing, electrically connected to the control module and configured to sense a gesture other than a motion generated by the electronic device within the projection region when the casing is fixed on the object during the operation of the electronic device, wherein the control module is configured to apply the gesture sensed by the motion sensor to change a size or a position of the frame relative to the projection region, the casing has a planar terminal portion facing towards the projection region, and the micro-projector and the motion sensor protrude from a same surface of the planar terminal portion and are disposed parallel to each other on the planar terminal portion.

13. The electronic device according to claim 12, further comprising:

a wireless communication module, disposed in the casing and electrically connected to the control module;

a speaker unit, disposed in the casing and electrically connected to the control module; and an audio-receiving unit, disposed in the casing and electrically connected to the control module.

14. The electronic device according to claim 13, wherein the casing comprises a sound-output aperture and a sound-input aperture, and the sound-output aperture and the sound-input aperture are correspondingly connected through the speaker unit and the audio-receiving unit, respectively.

15. The electronic device according to claim 13, wherein the casing comprising a first casing element and a second casing element, wherein the speaker unit is disposed in the first casing element, the audio-receiving unit is disposed in the second casing element, and the second casing element is slidably covered by the first casing element to enable the audio-receiving unit to approach or depart from the speaker unit.

16. The electronic device according to claim 12, further comprising:

a camera unit, disposed on the casing, electrically connected to the control module and configured to capture an image within a camera region.

17. The electronic device according to claim 16, wherein the camera unit protrudes from the planar terminal portion of the casing to enable the camera region of the camera unit to be a wide viewing angle.

18. The electronic device according to claim 16, wherein a range of the camera region is substantially equal to a range of the projection region.

19. The electronic device according to claim 12, wherein the wearing element is an earhook element disposed adjacent to the sound-output aperture of the casing.

20. The electronic device according to claim 19, wherein the casing is pen-shaped, and the earhook element is adapted to be a pen clip.

21. The electronic device according to claim 12, further comprising:
   a key set, disposed on the casing and electrically connected to the control module.

22. The electronic device according to claim 21, wherein the key set comprises a power key or a set of volume control keys.

* * * * *